Dec. 26, 1950      L. H. LARSSON      2,535,297
CAMERA FOR MULTIPLE EXPOSURES Filed March 27, 1947      9 Sheets-Sheet 1

Inventor:
Lars Henrik Larsson,
By: Pierce, Scheffler & Parker,
Attorneys.

Dec. 26, 1950     L. H. LARSSON     2,535,297
CAMERA FOR MULTIPLE EXPOSURES Filed March 27, 1947     9 Sheets-Sheet 5

Fig.5

Inventor:
Lars Henrik Larsson,
By: Pierce, Scheffler & Parker,
Attorneys.

Dec. 26, 1950   L. H. LARSSON   2,535,297
CAMERA FOR MULTIPLE EXPOSURES
Filed March 27, 1947   9 Sheets-Sheet 8

Inventor:
Lars Henrik Larsson,
By: Pierce, Scheffler & Parker,
Attorneys.

Dec. 26, 1950      L. H. LARSSON      2,535,297
CAMERA FOR MULTIPLE EXPOSURES Filed March 27, 1947      9 Sheets-Sheet 9

Patented Dec. 26, 1950

2,535,297

UNITED STATES PATENT OFFICE 2,535,297

CAMERA FOR MULTIPLE EXPOSURES

Lars Henrik Larsson, Uppsala, Sweden

Application March 27, 1947, Serial No. 737,442
In Sweden September 21, 1944

Section 1, Public Law 690, August 8, 1946
Patent expires September 21, 1964

2 Claims. (Cl. 95—37)

This invention relates to a photographic camera for the exposure of several photographic images beside and beneath each other on a single plate or film. This camera comprises a driving mechanism adapted for stepwise displacement in two directions at right angles to each other of a support for the sensitive material such as film or plate relatively to an objective. The camera also comprises an obturator, an obturator mechanism and a view finder.

The main object of my invention is to produce a camera of the type described, which makes it possible to take photographic images of the same good quality as with larger studio cameras for the exposure of only one picture on each plate or film.

Another important object of my invention is to coordinate all the driving members of the camera so that the displacement of the support, and the function of the obturator and the view finder are operated in the correct order of sequence from a single driving shaft.

A further object of my invention is to produce a camera of the kind described, which can be driven by an electric motor, so as to permit the starting of the necessary functions by manual actuation on a press-button or other similar operating member of simple design.

Still another object of my invention is to provide a camera with a driving mechanism for the displacement of the plate support and a controlling mechanism therefor adapted for taking pictures of varying size after a simple adjustment.

The invention has also for its object to provide a camera for multiple exposures having the same possibilities of setting as reflex cameras, in which the focussing of the objective and the position of the object in the exposure frame can be controlled on a ground glass for each exposure.

The following is a more detailed description of some exemplifying embodiments of the invention illustrated in the accompanying drawings, in which.

General structure

The housing 10 of the camera, formed preferably as a wooden box with a removable, preferably metallic rear wall 12, contains a box-like support frame 14 preferably of metal, in which the major part of the different parts belonging to the driving mechanisms, the obturator mechanism, the view-finder and the objective are mounted. The support frame, in the following called support comprises two side walls 16 and 18 and a rear wall 20 disposed at a short distance in front of the rear wall 12 of the camera housing (Fig. 3). Between the side wall 16 and the housing there is a room 21 (Figs. 1 and 2), within the support a room 22 and between the side wall 18 and the housing a room 24. The room 22 within the support contains essentially the driving mechanism for the obturator, the view finder and the like, while the outer rooms 21 and 24 contain the driving motor, power transmissions, relays, electric lines etc.

The objective 26 of the camera is mounted in a telescopic tube 28 projecting outside the front 30 of the camera housing 10 and the light passing through the objective is, during the exposure, projected through an opening 32 in the rear wall of the support and an opening 34 in the rear wall 12 of the camera housing onto a plate or film mounted in a support on the outside of said wall 12. The support is adapted for displacement stepwise in vertical and horizontal direction so as to expose only a portion of the same plate at each exposure. The following is a description of the automatically operating means herefor.

The objective

The objective 26 of the camera can in its optical part, the lens, be of any appropriate kind. The telescoping tube 28 is slidably guided in a rear tube 36, which is fastened onto an intermediate wall 40, which forwardly confines a small chamber 42 within the support 14. The displacement of the tube 28 for the focussing of the objective is operated by a hand wheel 44 and a belt 46 running over a pulley 48 fixed on the tube. The hand wheel is journalled on a fixed shaft 50 and projects through an opening 52 in the top wall of the camera housing, so as to be accessible from the outside. The pulley has the form of a ring with an inward projection 54 engaging an oblique groove 56 in the tube 28 permitting the displacement of the tube by rotating the ring.

Reflector and view-finder

The view-finder comprises a mirror 58 fastened on the upper side of a shutter 59 mounted on a rotatable shaft 60. In the upper part of the chamber 42 enclosing the mirror there is a horizontal partition 62 with an opening 64, against which the shutter 59 is pressed so as to close said opening when in its upper position. Above the partition 62 there is a focussing screen or ground glass plate 66 and an image of the object to be photographed can be projected on said focussing screen via the mirror 58. For this purpose, the shutter with the mirror is turned downwards, preferably so as to form an angle of 45° with the optical axis of the objective. In this lower position the shutter 59 rests against the border of a diagonally cut off casing 68, fixed on the rear wall of the support and projecting forwards in front of the opening 32, so that the opening is entirely screened off from incident light.

Figure 2:
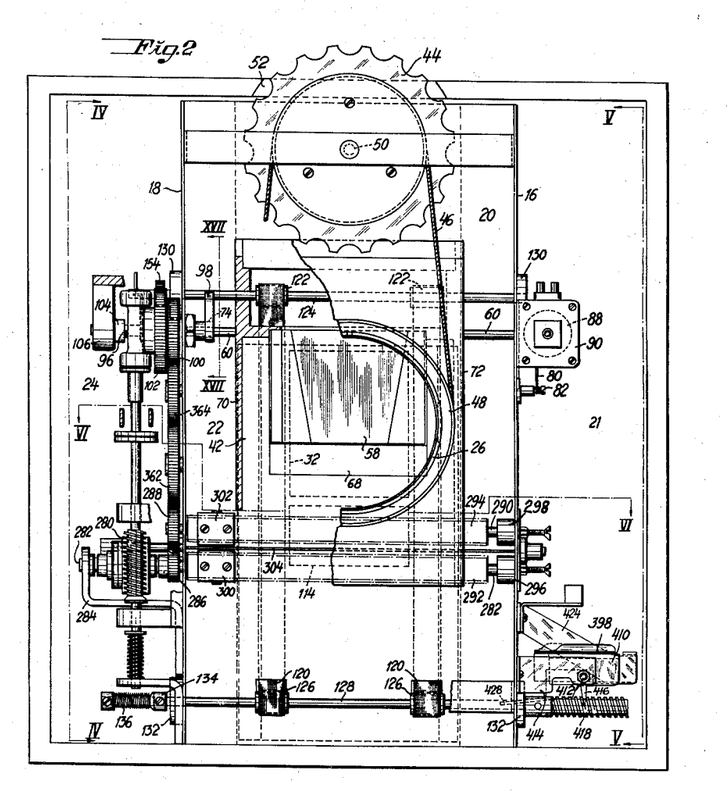
Fig. 2 is a front view of the camera with certain parts broken away to disclose the inner parts of the camera.
Figure 3:
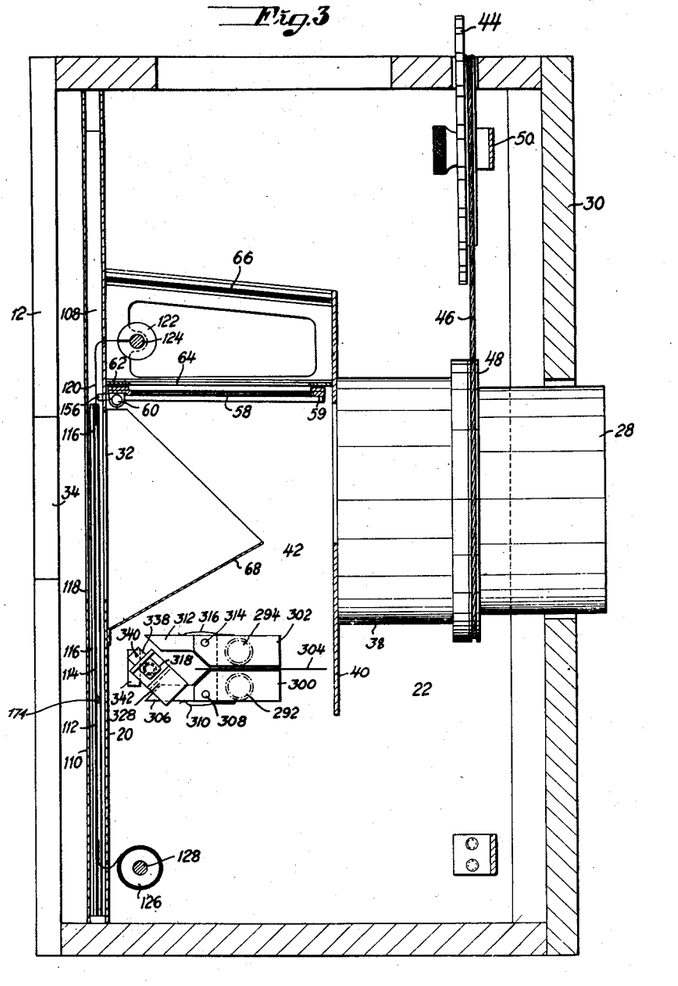
Fig. 3 is a vertical section through the middle plane of the camera essentially along its optical axis.
Figure 4:
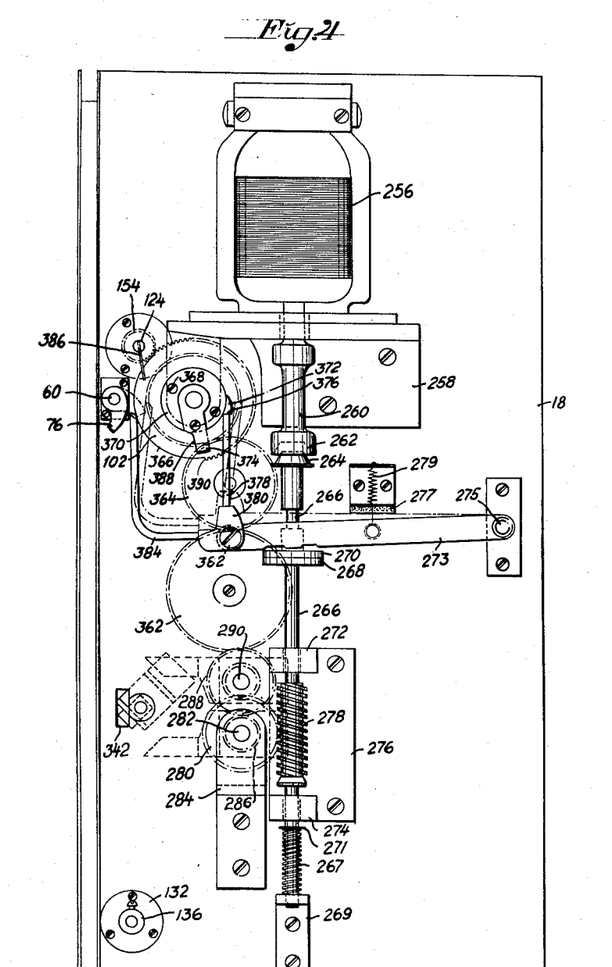
Fig. 4 is a vertical projection of a support disposed on the inside of the camera housing with parts fixed thereon seen from the left as shown by the line IV—IV in Fig. 2.
Figure 5:
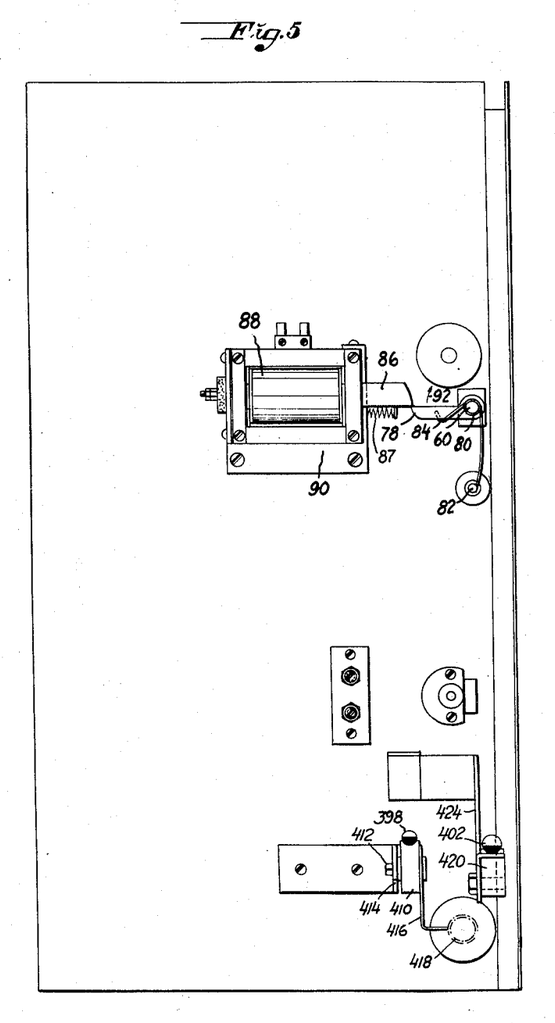
Fig. 5 is a vertical projection of the support shown in Fig. 4 with parts fixed thereon seen from the right as shown by the line V—V in Fig. 2.

The mirror shaft 60 extends, as shown in Fig. 2, through both side walls 70, 72 of the chamber 42 and through the side walls 18 and 16 and is in the space between the walls 70 and 18 provided with an arm 74 (Figs. 2 and 17) and outside the partition 18 on its end with a projection 76 (Fig. 4). On its end projecting outside the support wall 16 the mirror shaft has also a pawl 78 (Fig. 5) and a spring 80, one end of which is fastened on the support partition by a screw 82, the other end 84 being bent in under the pawl 78. This spring 80 tends to swing the mirror shutter 59 upwards against the partition 62 in a position closing the opening 64, but is prevented therefrom by a catch slide 86 forming the movable core of an electromagnet coil 88, which is fastened on the support partition 16 by a fastening device 90 (Figs. 2 and 5). The spring 80 tends to turn the shaft 60 in a clockwise direction as seen in Fig. 5 and as illustrated by the arrow 92, the pawl 78 being, in the position illustrated in Fig. 5, maintained in a position corresponding to the lower position against the casing 68 (Fig. 3) of the mirror shutter 59 by the catch slide 86. A spring 87 tends to keep the catch slide 86 in the locking position.

Figure 16:
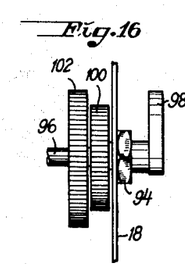
Fig. 16 is a vertical projection of a part of the driving mechanism shown in Fig. 2.
Figure 17:
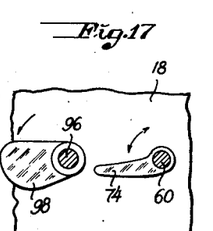
Fig. 17 is a vertical projection of the part shown in Fig. 16 seen from the right in Fig. 16.

A short axle 96 is journalled in a bearing 94 in the support wall 18, as shown in Figs. 2, 16 and 17, said short axle supporting, inside the wall, a cam 98 and outside thereof two gears wheels 100, 102, of which one 100 is adapted for driving the axle 96 so as to turn the shaft of the mirror by means of the cam 98 and the arm 74 against the action of the spring 80 as more clearly described below. The outer end of the axle 96 is journalled in a bearing 104, which is supported by a bracket 106.

Obturator and obturating mechanism

Disposed behind the support wall 20, in the space 108 (Fig. 3) between said wall and a partition 110 fixed thereon, is a obturator 112 in the form of a plate with an opening 114. The obturator plate is guided by its side edges in guides 116 and can be displaced vertically in said guides, so that the opening 114 moves past the opening 32 in the wall 20 and a corresponding opening 118 in the fixed partition 110.

The obturator plate 112 is at a distance from its upper edge fastened on two vertically running belts 120, the upper ends of which are fastened on rollers 122 fixedly mounted on an upper obturator shaft 124, their lower ends being fastened on rollers 126 on a lower obturator shaft 128. The upper shaft 124 is journalled in bearings 130 and the lower shaft 128 in bearings 132 in the walls 18 and 16.

Figure 1:
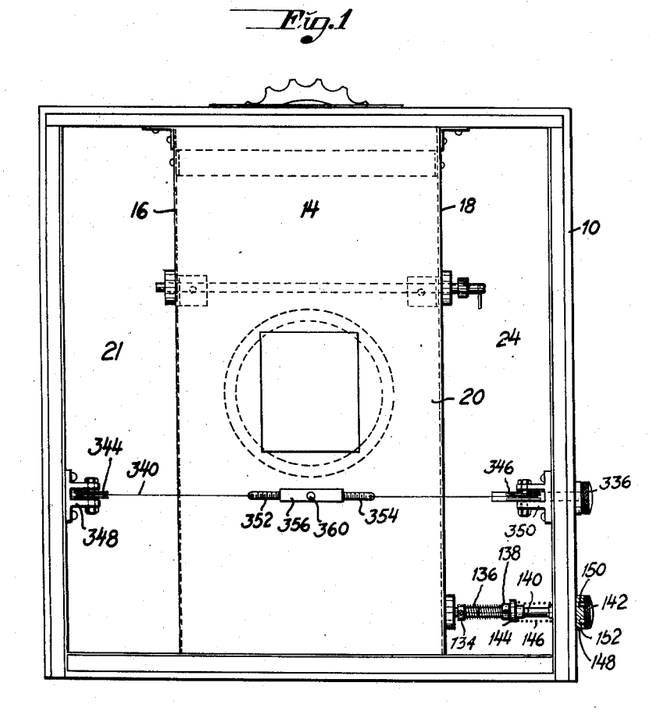
Fig. 1 is a rear view of the camera in which the back portion and some other parts are removed for the sake of clearness.

A ring 134 is fixedly mounted on one end of the lower obturator shaft 128 and one end of an obturator spring 136 is fastened on said ring (Fig. 1). The other end of the spring is by means of a ring 138 fixed on the inner end of a setting axle 140, the outer end of which projects outside the camera housing and there is provided with a setting button 142. A spring 146 is disposed between the inner side of the camera housing and a stop ring 144 on the setting axle, said spring tending to displace the axially displaceable axle inwards so as to press the inner face of the setting button against a plate 148 on the outer side of the camera housing. The setting button 142 has inwardly projecting pins 150 adapted to be engaged into some of a number of recesses 152 in the plate 148. The tension of the obturator spring 136 can thus be adjusted by drawing the setting button outwards and turning it to the desired position, whereby the rapidity of the displacement of the obturator plate 112 with its opening 114 past the opening 32 by the traction exerted by the shaft 128 and the rollers 126 on the belts 120, can be adjusted, or in other words whereby the time of exposure can be set.

The obturator plate is displaced to a position ready for exposure, i. e. to the upper position by rotating the shaft 124, whereby the belts 120 are rolled up on the rollers 122. The upper shaft 124 is for this purpose on its left end, as seen in Fig. 2, outside the support wall 18 provided with a gear wheel 154, which, as described below, is adapted to be rotated by the gear wheel 102.

Figure 9:
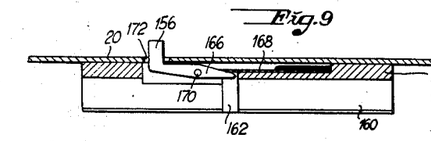
Fig. 9 is a horizontal projection of a bearing for a rotatable mirror and a catch mounted thereon.
Figure 10:
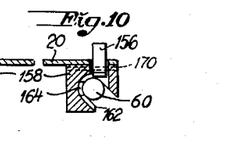
Fig. 10 is a cross section of the bearing shown in Fig. 9 with the mirror shaft placed therein.

The obturator plate is maintained in the upper "ready" position by means of a catch 156, actuated by the mirror axle 60 (Figs. 9, 10 and 3). The mirror axle extends behind the shutter 59 through a forward open bearing 158 with a cylindrical bearing surface 160 having a transverse groove 162. An abutment 164 on the mirror axle runs in this groove. One end of a double-armed lever 166 extends into said groove 162 and is actuated by a leaf spring 168 in the direction towards the mirror axle. The lever is rotatably mounted on an axle 170 and is at its other end provided with the catch 156, which by the action of the spring is maintained in a position extending through an opening 172 in the wall 20, so as to project into the path of a tooth-formed abutment 174 in the obturator plate (Fig. 3). When the obturator plate by means of the rollers 122 on the upper shaft 124 and the belts 120 is lifted to the upper position, the tooth-formed abutment slides past the catch 156 and cooperates with the latter to prevent the obturator slide from falling down. The obturator mechanism is actuated by the mirror axle, when this axle, at the upward movement of the mirror shutter 59, is rotated and the end of the lever cooperating with the abutment 164 is pressed outwards by said abutment causing the catch 156 to swing inwards into the opening 172 so as to release the tooth-formed abutment.

*Dark-slide support and its guiding means*

Figure 11:
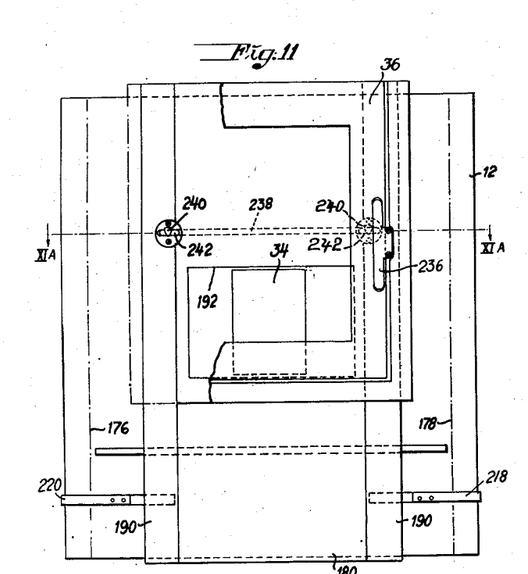
Fig. 11 is a vertical projection of the camera seen from the rear side with the dark-slide support mounted therein.
Figure 15:
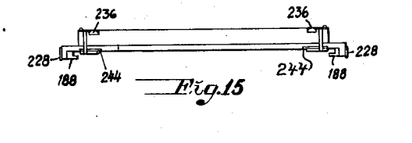
Fig. 15 is a top view of the dark-slide support.

The rear wall 12 of the outer camera housing 10 has mounted on it a horizontally displaceable slide or plate 180 on which the dark-slide support 36 formed as a frame is displaceable stepwise in vertical direction. In Fig. 11 the broken lines 176 and 178 show two positions for respectively the left and the right side edges of the dark-slide support in its left and right end positions, respectively. The slide 180 (Fig. 12) is suspended by means of angle iron supports 182 on a horizontal guide 186 at the upper edge of the rear wall, and similar angle iron supports 184 extending through a slot 185 in the rear wall 12 engage, from below, a guide 187 disposed at a distance from the lower edge of the rear wall on its inside. The dark-slide support has edge guides 188 (Fig. 15) along its side edges, gripping over vertical edge bars 190 on the vertical side edges of the slide 180.

The slide 180 has an opening 192 of at least the same height as the opening 34 in the rear wall of the camera and of a width, which is greater than the width of said opening 34, for instance more than twice the said width. When the slide is displaced horizontally by the means described below, different parts of the opening 192 are placed in position relatively to the opening 34, through which the image is projected on the plate or film in a dark-slide held in place by the support 36.

Figure 12:
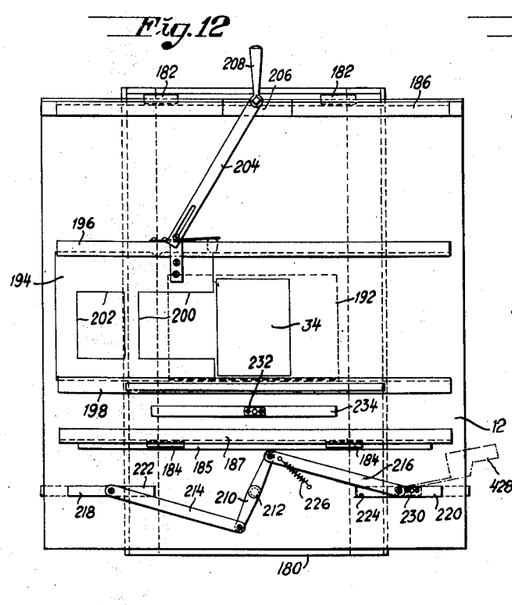
Fig. 12 is a vertical projection of the rear wall of the camera seen from the inside.

The effective width of the image can be adjusted by means of a masking device. This consists, according to Fig. 12, of a screen 194, which is displaceable on horizontal guides 196, 198 on the inside of the rear wall 12 and which is provided with a number of openings of less size than the opening 34. Fig. 12 shows an opening 200, which has at least the same width as the opening 34 but is of less height, and an opening 202 having its width as well as its height less than those of the opening 34. The screen 194 is connected to a lever 204 by a pin engaging a groove, said lever extending through an opening 206 in the guide 186 to the upper edge of the rear wall, where the lever has a handle 208 accessible from the top of the camera. By swinging the handle to one or the other side the screen can be displaced along the guides 196, 198 to the desired position in relation to the opening 34.

Figure 14:
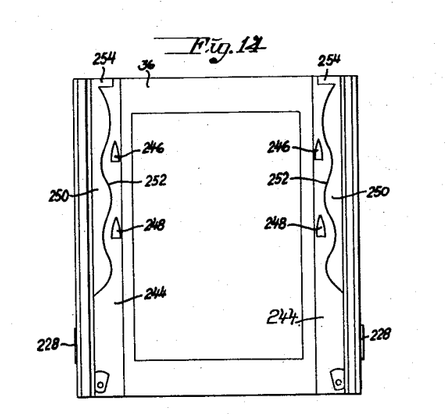
Fig. 14 is a front view of the dark-slide support.

As noted above, the slide 180 is to be moved laterally on the camera back 12 to bring different, horizontally alined sections of the film or plate into position for exposure, and the plate holder support 36 is vertically movable upon the slide 180 to bring successive horizontal bands of the film or plate into position for exposure of different sections according to the adjustment of the slide 180. At the completion of the last exposure, the driving connection for displacing the slide 180 is again rendered operative and moves the slide to actuate a mechanical linkage to open the motor circuit. This linkage includes a double-armed lever 210 journalled on a pin 212 secured approximately at the center line of the inner face of the camera rear wall 12, the ends of the lever being connected by links 214, 216 to members 218, 220 slidable in horizontal slots 222, 224 in the rear wall 12 (Figs. 11 and 12). The sliding members 218, 220 project somewhat beyond the rear face of the back wall member, and are normally retained in their relative positions of maximum separation by a spring 216 which is connected between lever 210 and the camera back wall 12. The plate holder support 36 has abutments 226, 228 (Figs. 14 and 15) secured to its side edges in position to aline horizontally with the sliding members 218, 220 when the plate holder support is in its lowermost position for exposure of the last row of sections of the film or plate. A pin 230 projects forwardly from the sliding member 220 and forms a stop or support for an arm 428 (Figs. 6 and 12) secured to a tilting mercury stop switch. Displacement of the slide 180 inwardly from either outward position effects an inward movement of both sliding members 218, 220, in view of the engagement of an abutment 228 of the plate holder support 36 with one of the sliding members, thereby displacing the pin 230 to lift arm 428 to open the motor circuit, as will be described hereinafter.

A coupling member 232 (Figs. 6 and 12) is secured to the forward face of the slide 180 and guided in a horizontal slot 234 in the rear wall 12, the coupling member being connected to a driving band, as will be described later, for displacing the slide horizontally in both directions.

The frame-like dark-slide support 36 has on its back side fastened to it two springs 236 (Fig. 11), by which a dark-slide can be held in position in the support.

Figure 11A:
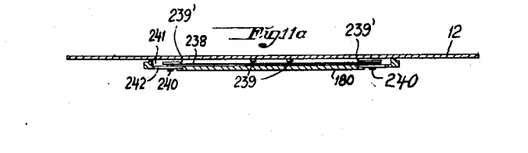
Fig. 11a is a horizontal section through the rear wall of the camera.

The dark-slide frame and the slide 180 have guiding and catching members mounted thereon, which serve the purpose to control the position of the dark-slide support in the vertical direction when the slide is displaced horizontally, so that the dark-slide support after each exposure receives a stepwise motion. The steps of motion must be adapted so that a certain portion of the surface of the sensitive material is exposed at each exposure until the whole surface is exposed. For this purpose a catch bar 238 (Figs. 11 and 11a) is longitudinally slidable in a channel 241 in the slide 180, the catch bar having two supporting projections 240, one at each end, and projecting through slots 242 on the rear side of the slide. The amplitude of longitudinal motion of the bar 238 is limited by the length of the grooves 242. On the wall 12 facing the bar 238 there are two abutments 239 (Fig. 11a) adapted to cooperate with abutments 239' on the bar 238 in the end positions of the slide 180, whereby the bar 238 is stopped and its supporting projections 240 are caused to take new positions in the grooves 242. The side of the dark-slide support 36 facing the slide 180 has two strips 244 removably mounted thereon, each strip having two supporting projections 246, 248 placed above each other and adapted for resting alternately on the supporting projections 240 of the bar 238. Besides the projections 246, 248 each strip 244 has also mounted on it a guide rail 250 with a wave-shaped edge 252 facing the projections 246, 248 and adapted to guide the supporting projections 240 so as to place them in the right position in relation to the next pair of supporting projections on the strips 244 when the dark-slide support 36 is moved vertically. In order to change the vertical dimension of the frame of exposure, the strips 244 are removed and replaced by other strips with another vertical space between the supporting projections. The guide rails 250 have at their upper ends facing each other projections 254 serving the same purpose as the supporting projections 246, 248, i. e. the dark-slide support with these projections 254 rests on the supporting projections 240, when the dark-slide support reaches its lowermost position in the slide 180.

The above described guiding means for the dark-slide support determines the extension of its steps of motion in the vertical direction. The extension of the steps of horizontal motion is determined by means described below in connection with the driving mechanisms.

*Driving mechanisms*

The different movements of the parts in the camera are obtained from a common driving motor, but can also be obtained by turning a hand crank. In the embodiment illustrated a driving electromotor 256 (Fig. 4) is used, which is supported by a bracket 258 on the wall 18. The shaft 260 of the motor is at its lower end provided with the one member 262 of a clutch, e. g. a claw or friction clutch the other member 264 of which is mounted on a shaft 266, which extends downwards in the prolongation of the motor shaft 260. The shaft 266 has a radial flange 268 supporting a fibre ring or the like 270. The shaft 266 is journalled for longitudinal displacement in bearings 272, 274 on a bracket 276 mounted on the wall 18. A spring 267 surrounding the shaft 266 at its lower end between a fixed support 269 and an abutment ring 271 fixedly mounted on the shaft, tends to press the shaft upwards, for keeping the coupling 262, 264 in engagement. A double lever 273 pivoted on a fixed pin 275 is normally lifted in engagement with an abutment 277 by a spring 279 and adapted to disengage the parts of the coupling when pressed down against the fibre ring 270 on the flange 268.

Between the bearings 272 and 274 the shaft is formed into a worm 278 engaging a worm wheel 280 keyed on a shaft 282 supported by a bracket 284 mounted on the wall 18. The shaft 282, which extends through the wall 18, has a smaller gear wheel 286 keyed on it and meshing with a larger gear wheel 288. The diameter of the smaller gear wheel 286 is preferably ⅔ of the diameter of the larger gear wheel 288, so that the former makes three revolutions while the latter makes two.

The gear wheel 288 is fixedly mounted on a shaft 290 parallel with the shaft 282 and journalled in and extending through the wall 18. The shafts 282, 290 have on the inside of the wall 18 each a screw-threaded portion 292, 294 with continuous threads extending nearly to the opposite wall 16, in which the ends of the shafts are journalled in bearings 296, 298. Each of the screws 292, 294 engages a nut 300, 302 these being maintained against rotation by a plate 304 disposed between the screws, parallel to these and mounted between the walls 16 and 18. A carrying arm 306 is rotatably mounted on the nut 300 by means of an axle 308 (Fig. 3) and maintained in horizontal position by means of a spring 310, against the action of which the arm can be turned outwards from the plate 304. A similar carrying arm 312 is rotatably mounted on the nut 302 by means of an axle 314 and actioned by a spring 316. A bar 318 (Fig. 6) of square cross section, the circular ends 320, 322 of which are journalled in bearings 324, 326 in the walls 18 and 16 respectively, serves as a guiding support for a slide 328 displaceably mounted thereon and provided with a recess 330 adjusted to the dimensions of the carrying arms 306 and 312. The end 320 is by means of a sleeve 332 coupled to the shaft 334 of a turning button 336 journalled in the outer housing 10 of the camera. By turning the button 336 in one direction or the other the slide 328 can be brought into engagement with one or the other of the carrying arms 306, 312.

A wire 340 fastened onto an extension 338 of the slide 328 extends through openings 342 in the walls 16 and 18 and runs over reels 344, 346 journalled in bearings 348, 350 on the opposite side walls of the camera housing (Fig. 1). The ends of the wire 340 extend on the rear side of the support frame 14 between this and the removable rear wall 12 of the housing and are connected each to a screw 352, 354 engaging a bush 356 with inner screw threads. The screws are threaded in opposite sense so as to permit the tensioning of the wire by turning the bush. The bush 356 is by means of a screw 358 (Fig. 6) engaging a hole 360 fastened on the previously mentioned fastening member 232 fixed on the slide 180 on the wall 12. When the screw, the carrying arm (e. g. 312) of which for the moment engages the slide 328 on the square bar 318, is rotated, the wire 340 will draw the slide 180 in horizontal direction and displace it along the horizontal guides 186, 187 on the rear wall 12.

The driving means for the mirror axle and the obturator are the following:

Motion is transmitted from the gear wheel 288 by means of two gear wheels 362, 364 to the previously mentioned gear wheel 100, which is keyed on the axle 96 (Figs. 2, 16 and 17). At the rotation of the wheel 100 this axle actuates the arm 74 of the mirror axle by means of the cam 98 so as to turn the mirror upwards.

The gear wheel 102 is also keyed on the axle 96 and adapted for driving the upper shaft 124 of the obturator belts by means of the gear wheel 154. The gear wheel 102 (Fig. 4) has cogs only on such a portion of its periphery, which is necessary for permitting the gear wheel 102 by engagement with the gear wheel 154 to lift the obturator plate from its lower position to its upper position of readiness for exposure. On the remaining part of its periphery the gear wheel 102 has a smooth cylindrical surface 366 (Fig. 4) permitting the wheel 102 to rotate without driving the gear wheel 154 after the obturator has been lifted into the "ready" position, and the obturator is furthermore able to move during the exposure and to rotate the gear wheel 154 which is not kept back by the wheel 102.

Figure 6:
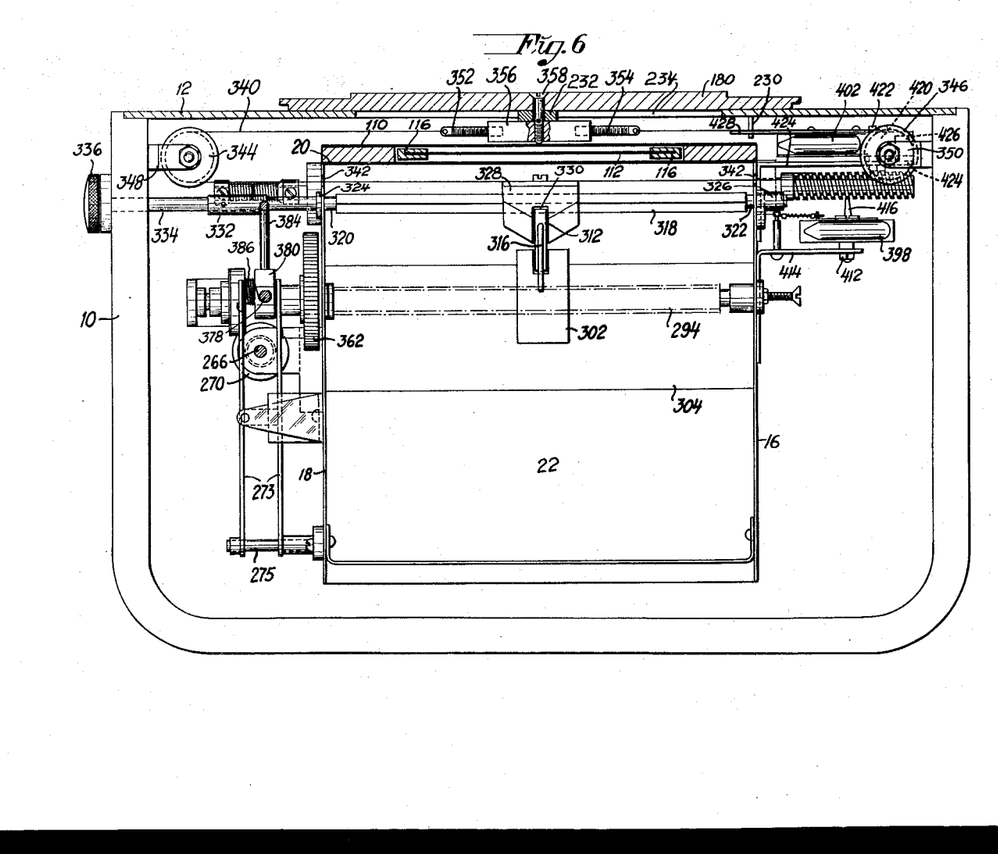
Fig. 6 is a horizontal section through the support along line VI—VI in Fig. 2.
Figure 7:
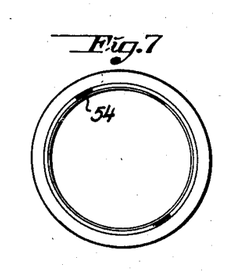
Figs. 7 and 8 are respectively a front view and a side projection of the objective tube.
Figure 8:
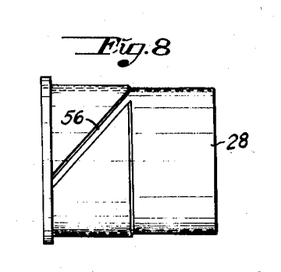

A disc 370 with a projecting tooth 372 is fastened on the wheel 102 by means of screw 368, and a carrying arm 374 bent at an angle is fastened onto the disc. The tooth 372 has a radial edge 376, in the path of motion of which is situated the upper end of an upwards extending bar 378, which is fastened on a member 380 rotatably mounted on a bolt 382, which holds together both arms of the double lever 273. The member 380 also supports a bar 384, which is bent at an angle and which extends to a point facing the projection 76 on the mirror shaft 60 (Figs. 4 and 6). A spring 386 (Fig. 6), tensioned between the bar 378 and one arm of the double lever 273, tends to turn the member 380 in the counter clockwise direction, as seen in Fig. 4, so as to keep the bar 378 against the periphery of the disc 370. The member 380 can by means of the projection 76 be turned so that the bar 378 is swung out of the path of the tooth 372 to the position indicated by broken lines in Fig. 4, which is the case at the moment of exposure.

The carrying arm 374 on the disc 370 has also such a position, that, when the wheel 102 and the disc 370 are rotated, the arm hits a pin 386 fixed on the end of the upper obturator shaft 124. The forward edge 388 of the carrying arm 374 is positioned immediately at a level with one end 390 of the toothed portion of the wheel 102 and is adapted to rotate the shaft 124 by engaging the pin 386, so that the gear wheel 154 is sure to engage the cogs of the wheel 102 when its smooth portion has passed the gear wheel 154.

*Electric governing means*

Figure 18:
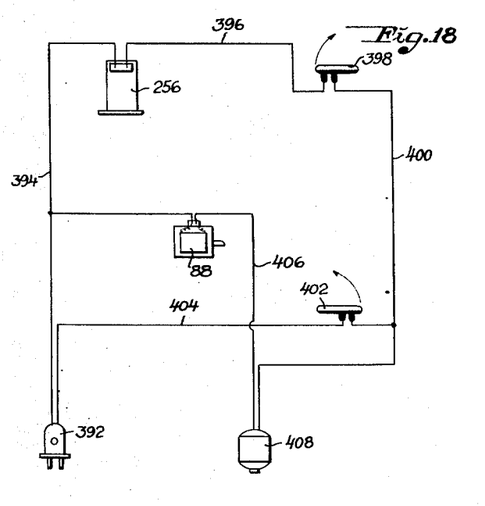
Fig. 18 is an electric wiring diagram.

The electromotor 256 and the electromagnet 88 provided for the releasing of the catch of the mirror shaft and the obturator at the exposing moment, are branched in an electric circuit according to the wiring diagram in Fig. 18. The circuit comprises a source of current 392, a line 394 to the motor 256 and a line 396 from the motor to a mercury switch 398, a line 400 to another mercury switch 402 and a line 404 back to the source of current 392. In a line 406 between the switch 402 and the line 394 are branched a governing switch 408 and the electromagnet 88.

The mercury switch 398 is, as shown in Figs. 2, 5 and 6, supported by a bed 410 mounted on an axle 412, fixed on a bracket 414 in the lower part of the support wall 16. An angular arm 416 is fastened on the bed 410 and has its end cooperating with a screw 418, which is mounted in prolongation of the end of the lower obturator shaft 128, which extends through the support wall 16. The switch 398 is normally closed, the bed taking the horizontal position shown, but is inclined and breaks the current to the motor 256 when the obturator has been lifted to the upper position ready for exposure. This is effected by means of the screw 418, which is rotated together with the obturator shaft 128.

Figure 13:
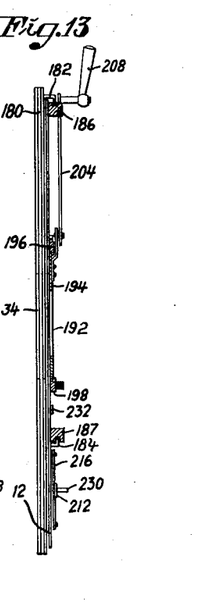
Fig. 13 is a side projection corresponding to Fig. 12.

The switch 402 is intended to be normally closed and breaks the circuit only when all the exposures, which can be made on the same film are made. This switch 402 is placed in a bed 420 which is mounted on a bolt 422 fixed on a bracket 424. This has an abutment 426, against which one end of the excentrically journalled bed is resting when the switch is closed. The bed is further provided with an actuating arm 428, which extends into the path of motion of the pin 230, which according to Figs. 12 and 13 is disposed on the sliding member 220, which, according to the previous description, is actioned by the dark-slide support in the lower position of the latter.

When, after exposing the last image, the dark-slide support is moved horizontally, the pin 230 slides on the inclined under edge of the arm 428 and lifts thereby the inner end of the switch, so that the current to the motor is broken.

*Working of the camera*

The size of the images has first to be chosen. The total sensitive surface of the film or plate, which can be exposed, is the same as the opening of the dark-slide supporting frame 36 (Fig. 11). Within this area it is possible to choose different numbers of images. In the example illustrated it is possible to take two or three horizontal rows of images above each other and either two or three images in each row on one and the same plate. When the screen 194 is adjusted with its opening 202 facing the opening 34, three images can be exposed on each row, and if the screen is displaced in its outmost side position or if the opening 200 is facing the opening 34, only two images can be exposed. The height of the images is also reduced, when the screen masks off the opening 34, for which reason three rows of images can be exposed. It is also possible to use the same dark-side support but to remove and replace the strips 244 by others with another number of and space between the projections and thereby to change the number of images.

Supposing, that the screen 194 is wholly pushed aside, so that a total number of four images can be exposed. The slide 180 is first displaced to one or the other side, e. g. to the left, so that its left edge takes the position shown by the line 176 in Fig. 11. The dark-slide support is pushed in from above and rests with its projections 248 on the supporting projections 240 (Fig. 11), so that the dark-slide is sustained in its uppermost position. The opening 192 of the slide 180 is then positioned with its right hand half facing the opening 34.

In order to adjust the translating motion of the dark-slide support in accordance with the image size, the slide 328 is adjusted on the square bar 318 by turning this by means of the button 336, so as to couple the slide with the nut on the corresponding screw. As the larger image size is supposed to have been chosen, which thus demands a greater displacing step of the dark-slide after each exposure, that one of the screws, which rotates with the higher speed, is to be put in action, i. e. the screw 292, on the axle of which the smaller gear wheel 286 is mounted. The button 336 is thus turned so that the recess 338 of the slide can be engaged by the lower arm 306, i. e. into the position illustrated in Fig. 3.

The camera is then supposed to be in all respects ready for exposure.

The obturator plate 112 is thus lifted in its upper position, in which it is maintained by the catch 156. The shutter 59 with the mirror 58 are in the lower turning position and tighten against the inclined opening of the casing 68, so that no light from the objective can reach the sensitive material placed in the dark-slide. The mirror shaft is kept in locked position by the catch slide 86 of the electromagnet (Fig. 5). The correct focussing of the image can be observed on the image projected by the objective on the ground glass 66 and if required the necessary adjustment can be effected by turning the button 44.

The motor must not rotate during the exposure, as it could cause vibrations, which would trouble the exposure. The switch 398 is therefore open, i. e. the bed 410 is tilted by the screw 418 on the lower obturator shaft and the arm 416.

Furthermore, the obturator shafts must be able to rotate freely and independently from the other parts of the driving mechanism, for which reason the gear wheel 154 on the upper obturator shaft is in a position facing the smooth portion 366 of the periphery of the driving wheel 102.

The mechanical clutch 262, 264 is discoupled.

When the governing switch 408 is closed, the mirror is displaced, the obturator is released for the exposure, the dark-slide support is displaced one step, the mirror is returned to its lower position and the obturator is again lifted in the position ready for the next exposure. These operations are effected consecutively without any further intervention from the operator.

When closing the switch 408, the current circuit from one pole of the source of current 392 is connected over the closed mercury switch 402, the governing switch 408 and through the magnet coil 88 to the other pole of the source of current. The catch slide 86 is then attracted so as to release the powl 78 on the mirror shaft 60, which is then turned under the action of the spring 80 in clockwise direction, so that the shutter 59 together with the mirror are turned upwards against the partition 62 and permit light from the objective to fall through the opening 32 in the support wall 20 (Fig. 3). When the mirror shaft is rotated in this manner, the abutment 164 on the mirror shaft engages the lever 166 so that its catch member 156 goes into the opening 172 and out of engagement with the abutment 174 on the obturator plate 112. This plate is then moved downwards with a velocity determined by the tension of the spring 136, which rotates the lower obturator shaft 128, so that the belts 120 are wound up on its rollers 126. The opening 114 is displaced past the opening 32, so that light falls in through this and the opening 34 onto the sensitive material in the dark-slide. The belts 120 are simultaneously wound off from the rollers 122 on the upper obturator shaft 124, whereby even this shaft is rotated. The gear wheel 154 does not prevent this rotation because its cogs are facing the smooth portion of the periphery of the wheel 102. The cam 98 on the axle 96 is in the position illustrated in Fig. 17 and does thus not either resist the upward motion of the arm 74 of the mirror.

When the mirror shaft is turned during the upward motion of the mirror, its projection 76 is turned from the position shown in whole lines in Fig. 4 to the position marked with broken lines. During this movement the projection pushes the bent bar 384 on the part 380 causing this to turn into the position indicated by broken lines and the bar 378 is thereby turned out of engagement with the tooth 372. The clutch, which has been discoupled, as explained below, the double-armed lever 273 having, by means of the tooth 372 and the bar 378, been pressed down against the fibre ring 270 on the flange 268 against the action of the spring 279, is now free to be coupled. The double-armed lever 273 is namely, after the releasing of the bar 378, swung upwards under the action of the spring 279 against the abutment 277, so that the shaft 266 under the action of the spring 267 is displaced upwards and the coupling members 264 and 262 engage each other.

During the rotation of the lower obturator shaft at an exposure, the screw 418 on said shaft is also rotated, thereby displacing the angular arm 416 along the thread of the screw and the bed 410 with the mercury switch 398 is turned to the horizontal position. Thereby the current circuit from the one pole of the source of current 392 over the line 394, the motor 256, the line 396, the switch 398, the line 400, the mercury switch 402, which has been closed all the time, and the line 404 to the other pole of the source of current 392 is closed. The motor 256 is thus started and can work over the engaged coupling 262, 264.

When the shaft 266, which is coupled to the motor shaft 260, is rotated, the shafts 282 and 290 are rotated through the worm gear 278, 280, the shaft 282 driving the shaft 290 by means of the gear wheels 286, 288. The nuts 300, 302 on the screws 292, 294 are displaced along the screws. As the slide 328 is supposed to be turned downwards in engagement with the carrying arm 306 on the nut 309 of the screw 292, which corresponds to the larger width of image, the slide is carried away by the nut 300 correspondingly to the speed of rotation of the screw 292. The wire 340, which is fastened on the slide plate 180 of the dark-slide support carries the same in its movement with corresponding velocity. The slide 180 fastened to the wire is thus displaced sideways on the horizontal guides 186, 187 until a new part of the sensitive material is placed before the opening 34, at which moment the dark-slide support is stopped by the means indicated below. After the exposure, when the dark-slide support has begun a new translating motion, it will reach an outmost position, in which the left vertical edge of the support slide 180 is situated at a little distance outside the left vertical edge of the rear wall 12. During this motion the catch bar 238 is stopped by the one abutment 239. The supporting projections 248 of the dark-slide support 36 being pushed aside by the projections 249 of the catch bar. The dark-slide support 36 is then free to fall down, and moves vertically with its guides 188 along the edge bars 190 of the slide. One of the supporting projections 249 is then guided inwards by the waved edge of the corresponding guide rail 250 so that the catch bar 248 is displaced sideways and both supporting projections are placed in front of the projections 246 on the frame of the dark-slide support. In the outmost position the slide returns and moves inwards, until its left edge again reaches the line 176. The dark-slide support is then in the correct position for a new exposure.

When the motor shaft begins to rotate, the gear wheel 362 is also started by the gear wheel 288, the gear wheel 364 being thereby caused to rotate the gear wheel 100 and the axle 96. The cam 98 on this axle engages then the arm 74 on the mirror shaft and actuates the same, so that the shutter 59 with the mirror 58 are moved down again, until the shutter tightens against the edge of the casing 68. The pawl 78 then slips past the catch bar 86, which has been returned to the outer position by the return spring 87, after the current through the coil 88 having been cut off by the operator releasing the switch 408. The mirror shaft is thus locked again.

When the axle 96 rotates, the gear wheel 102 is also rotated in the clockwise direction as seen in Fig. 4. At the beginning of this movement the mirror shaft has not yet been returned, so that the tooth 372 is not prevented by the bar 378 from moving downwards at the rotation of the gear wheel 102 and the disc 370 fixed thereon. At the beginning the obturator is not either actuated, the smooth portion 366 of the wheel 102 moving past the motionless gear wheel 154 on the obturator shaft 124. The turning downwards of the mirror takes place however while the obturator still is in its upper position and the obturator is not tensioned before the mirror has closed the casing 68, so that no light can pass through the opening 34, when the opening 114 of the obturator during its upward movement moves past said opening. When the gear wheel 102 has been turned a certain angle the carrying arm 374 hits the pin 386 and turns the gear wheel 154, so that it can engage the first cogs of the wheel 102. The upper obturator shaft is now rotated, the belts 120 being rolled up on the rollers 122 and rolled off the rollers 126 on the lower obturator shaft. At the end of this movement the pawl 174 of the obturator slips past the projection 156 on the obturator stop controlled by the mirror axle, so that the obturator is locked in the position ready for exposure.

When the last cogs of the row of cogs on the wheel 102 are near to the gear wheel 154, the tooth 372 hits the bar 378, which at the return movement of the mirror axle and the arm 76 has been returned by the spring 386 to its position in the path of the said tooth. This tooth presses the bar downwards and presses thereby the double lever 273 against the fibre ring 270 on the flange 368 and disengages the coupling 262, 264. The sideways displacement of the dark-slide support is thereby at once stopped in the right position corresponding to the end of the desired step of displacement.

When the lower obturator shaft was rotated during the tensioning of the obturator to the ready position, the mercury switch was also tilted by the screw 418 and the angle arm 416 on the bed 410, so that the current to the motor was broken off, which is done immediately after the disconnecting of the coupling 262, 264.

All the parts are now motionless and the camera is ready for a new exposure.

When the last image has been exposed and the dark-slide support is in its lowermost position on the slide 180, it rests with its projections 254 on the projections 240. If the slide is now moved from one of its outmost positions towards the positions marked by the lines 176, 178, the right hand abutment 228 of the dark-slide support will abut against the slide 218, so that said slide is displaced and by means of its pin 230 actuates the arm 428 on the bed 420 of the switch 402, which breaks the current and stops the motor. The same functions will arise, if the slide is moved from its left outmost position, the left abutment 228 displacing the slide 218, the movement of which is transmitted by the link 214, the lever 210 and the link 216 to the slide 220, so that the pin 230 even in this case is displaced and can be actuated by the actuating arm 428. The switch 402 is closed again, if the dark-slide support is drawn upwards, so that the abutments 228 reach a level above the slide 218, the spring 226 then being able to action the returning motion of the lever 210, the links 214, 216 and the slides 218, 220.

What I claim is:

1. In a camera, mechanism for the displacement of a negative holder in a camera for the exposure of several photographic images beside and beneath each other on the same sensitive sheet carried by the negative holder; said mechanism comprising a support for the negative holder, a movable slide on which said support is mounted for displacement at right angles to the path of movement of said slide, a driving motor, a transmission with a certain transmission ratio driven by said motor and a transmission with another transmission ratio driven by the same motor, and manually controlled coupling means for selectively connecting said slide with one or the other of said transmissions in accordance with the desired larger or smaller image size and thus of a larger or a smaller step of displacement necessary after each exposure.

2. In a camera, mechanism as claimed in claim 1, wherein said transmissions comprise each a screw and a corresponding nut, cog gears actuated by said motor for driving the screws with different speeds, a guide running along the screws, a slide member slidably guided along said guide, means adjustable to couple said slide with one or the other of the nuts, an endless line or wire connected with said slide member, and means connecting said wire to said slide on which the negative holder support is mounted, whereby said slide is capable of displacement with higher or lower speed according to which of the nuts is coupled with the slide member.

LARS HENRIK LARSSON.

REFERENCES CITED

The following references are of record in the file of this patent:

UNITED STATES PATENTS

| Number | Name | Date |
|---|---|---|
| 1,662,304 | Doogood | Mar. 13, 1928 |
| 1,725,966 | Peden | Aug. 27, 1929 |
| 2,165,903 | Nuchterlein | July 11, 1939 |
| 2,172,283 | Kirby | Sept. 5, 1939 |
| 2,230,251 | Jochum | Feb. 4, 1941 |
| 2,234,345 | Hersberg | Mar. 11, 1941 |
| 2,275,519 | Friederichs | Mar. 10, 1942 |
| 2,292,825 | Dilks | Aug. 12, 1942 |
| 2,322,734 | Steiner | June 22, 1943 |

FOREIGN PATENTS

| Number | Country | Date |
|---|---|---|
| 469,284 | Great Britain | July 22, 1937 |
| 510,202 | Great Britain | July 28, 1939 |